(12) United States Patent
Li et al.

(10) Patent No.: US 9,633,279 B2
(45) Date of Patent: Apr. 25, 2017

(54) FREE SPACE POSITIONING METHOD AND SYSTEM

(71) Applicant: Wistron Corporation, New Taipei (TW)

(72) Inventors: Chong-Wei Li, New Taipei (TW); Tzu-Yao Lin, New Taipei (TW); Shou-Te Wei, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 337 days.

(21) Appl. No.: 14/465,128

(22) Filed: Aug. 21, 2014

(65) Prior Publication Data

US 2015/0262349 A1 Sep. 17, 2015

(30) Foreign Application Priority Data

Mar. 17, 2014 (TW) .............................. 103109946 A (51) Int. Cl.
 *G06K 9/52* (2006.01)
 *G01B 11/26* (2006.01)
 *G06K 9/20* (2006.01)
 *G06T 7/73* (2017.01)
(52) U.S. Cl.
 CPC ................ *G06K 9/52* (2013.01); *G01B 11/26* (2013.01); *G06K 9/2036* (2013.01); *G06T 7/73* (2017.01); *G06T 2207/10024* (2013.01); *G06T 2207/30204* (2013.01)
(58) Field of Classification Search
 None
 See application file for complete search history.

(56) References Cited

U.S. PATENT DOCUMENTS

| 2007/0081695 A1 | 4/2007 | Foxlin |
| 2010/0303337 A1 | 12/2010 | Wallack |
| 2016/0034771 A1* | 2/2016 | Schamp ............. G01B 11/2545 348/148 |

FOREIGN PATENT DOCUMENTS

| CN | 102762344 A | * | 10/2012 | ............ B25J 9/1697 |
| JP | 2002-90118 A | * | 3/2002 | |

OTHER PUBLICATIONS

English translation of CN 102762344 A.*
The Office Action issued to Taiwanese Counterpart Application No. 103109946 by the Taiwan Intellectual Property Office on Jul. 7, 2015 along with an English translation of sections boxed in red.

* cited by examiner

*Primary Examiner* — Sath V Perungavoor
*Assistant Examiner* — Janese Duley
(74) *Attorney, Agent, or Firm* — Steptoe & Johnson LLP (57) ABSTRACT

A free space positioning method for estimating an attitude angle of an object in a free space includes: capturing an image of a light source module that includes four light sources to generate a to-be-judged image; analyzing coordinates of the light sources in the to-be-judged image to obtain to-be-judged information; comparing the to-be-judged information with pre-stored light source orientation data to obtain candidate light source orientation data; and estimating an attitude angle of the object according to a pre-stored attitude angle corresponding to each of the candidate light source orientation data.

19 Claims, 4 Drawing Sheets

FREE SPACE POSITIONING METHOD AND SYSTEM

CROSS-REFERENCE TO RELATED APPLICATION

This application claims priority to Taiwanese Application No. 103109946, filed on Mar. 17, 2014, the entire disclosure of which is incorporated herein by reference.

BACKGROUND OF THE INVENTION

1. Field of the Invention

The invention relates to a positioning method, and more particularly to a free space positioning method and system.

2. Description of the Related Art

It has become popular to use a camera to acquire a position of an object in a three-dimensional (3D) space. For example, coordinates of an object in the 3D space may be obtained by: using a shape and a size of structured light projected onto the object to determine a position of the object; using a depth camera that employs a principle of time of flight (ToF) to calculate a distance between the object and the camera; and using a twin-lens camera to obtain two images for acquiring a depth of the object via parallax calculation. However, these methods are unable to detect an attitude angle (e.g., components of a yaw angle, a pitch angle and a roll angle) of the object.

SUMMARY OF THE INVENTION

Therefore, an object of the present invention is to provide a free space positioning method for estimating an attitude angle of an object in a free space.

According to one aspect of the present invention, a free space positioning method is provided for estimating an attitude angle of an object in a free space. The free space positioning method is to be implemented by a free space positioning system that includes a light source module, an image capturing module disposed at the object, and a computing module communicatively coupled with the image capturing module. The computing module includes a processing unit and a storage unit. The light source module includes a first light source, a second light source and a third light source that cooperate to define a plane, and a fourth light source disposed at one side of the plane. The storage unit stores a plurality of light source orientation data and a plurality of pre-stored attitude angles respectively corresponding to the light source orientation data. The free space positioning method comprises the steps of:

(A) capturing, by the image capturing module, an image of the light source module to generate a to-be-judged image, and transmitting the to-be-judged image to the processing unit of the computing module;

(B) analyzing, by the processing unit, coordinates of the first, second, third and fourth light sources in the to-be-judged image to obtain to-be-judged information associated with the coordinates of the first, second, third and fourth light sources in the to-be-judged image;

(C) comparing, by the processing unit, the to-be-judged information with the light source orientation data stored in the storage unit to obtain at least one candidate light source orientation data similar to the to-be-judged information; and (D) estimating, by the processing unit, an attitude angle of the object according to the pre-stored attitude angle corresponding to each of the candidate light source orientation data obtained in step (C).

Another object of the present invention is to provide a free space positioning system for estimating an attitude angle of an object in a free space.

According to another aspect of the present invention, a free space positioning system for estimating an attitude angle of an object in a free space comprises:

a light source module including a first light source, a second light source and a third light source that cooperate to define a plane, and a fourth light source disposed at one side of the plane;

an image capturing module to be disposed at the object, and configured to capture an image of the light source module to generate a to-be-judged image; and a computing module configured to communicatively couple with the image capturing module, and including:

a storage unit storing a plurality of light source orientation data and a plurality of pre-stored attitude angles respectively corresponding to the light source orientation data; and a processing unit coupled to the storage unit, and configured to analyze coordinates of the first, second, third and fourth light sources in the to-be-judged image to obtain to-be-judged information associated with the coordinates of the first, second, third and fourth light sources in the to-be-judged image, compare the to-be-judged information with the light source orientation data stored in said storage unit to obtain at least one candidate light source orientation data similar to the to-be-judged information, and estimate an attitude angle of the object according to the pre-stored attitude angle corresponding to each of the candidate light source orientation data.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
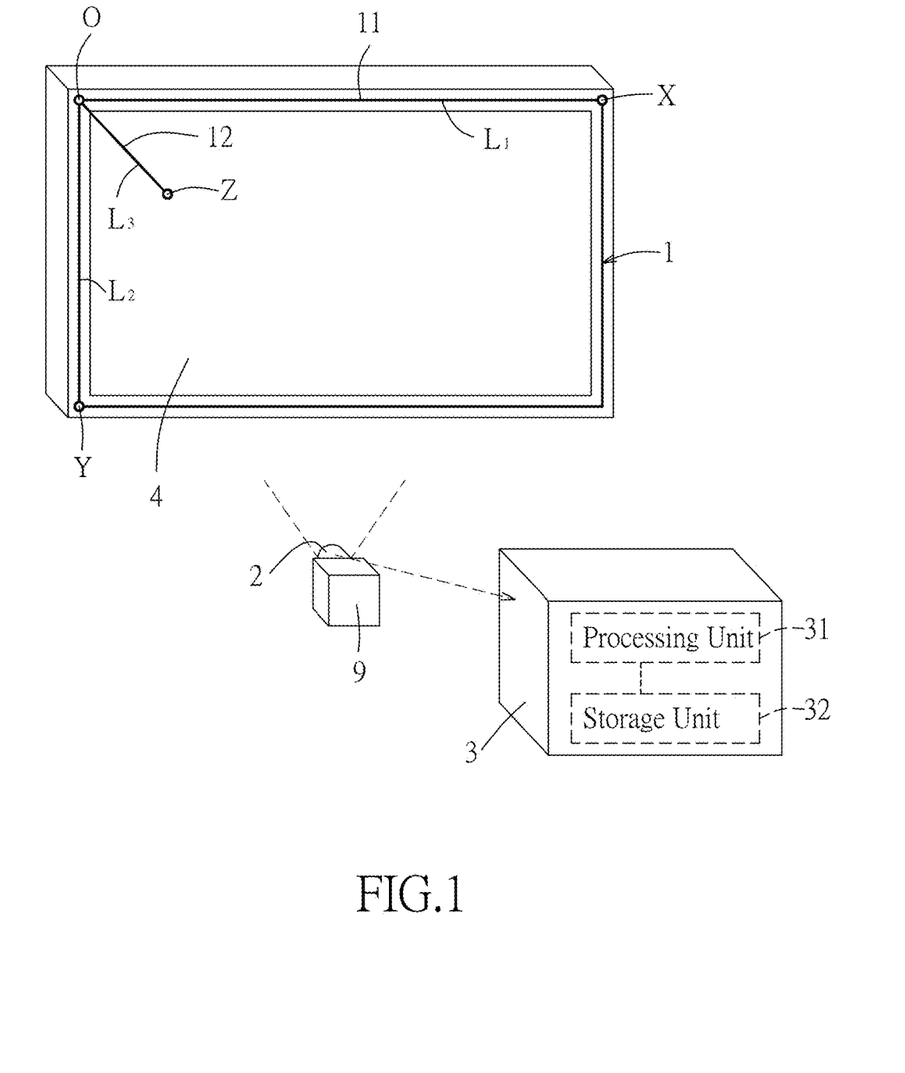
FIG. 1 is a schematic diagram showing an embodiment of the free space positioning system for implementing the free space positioning method according to the present invention.
Figure 2:
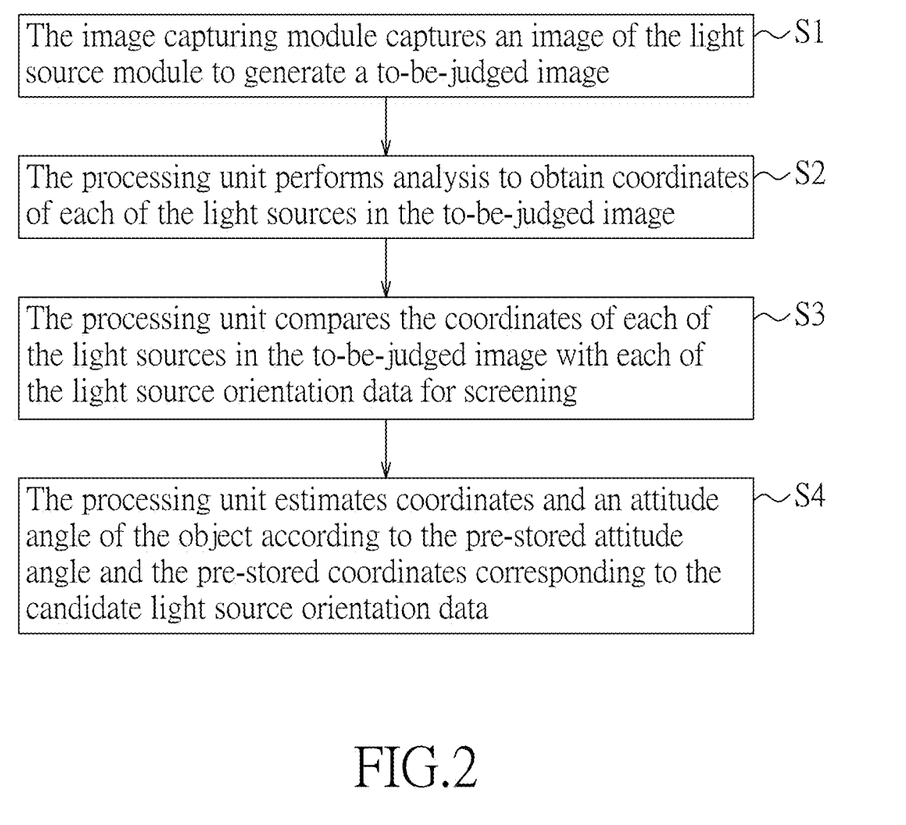
FIG. 2 is a flow chart illustrating the steps of the embodiment of the free space positioning method.

Referring to FIGS. 1 and 2, the first embodiment of the free space positioning method according to this invention is adapted for estimating an attitude angle and coordinates of an object 9 in a free space, and is to be implemented by a free space positioning system. The free space positioning system includes a light source module 1, an image capturing module 2 disposed at the object 9, and a computing module 3 communicatively coupled to the image capturing module 2. The computing module 3 includes a processing unit 31 and a storage unit 32 that are coupled to each other.

The light source module 1 includes a first light source O, a second light source X and a third light source Y that cooperate to define a plane, and a fourth light source Z disposed at one side of the plane. In this embodiment, the light source module 1 further includes a rectangular frame 11 connecting the light sources O, X and Y, and a cantilever arm 12 connecting the frame 11 and the light source Z, such that three lines formed between the light source O and each of the other three light sources X, Y, Z are perpendicular to one another. However, the present invention should not be limited in this respect, and only requires the light sources O, X, Y to be non-collinear to define the plane, and the light source Z to be non-coplanar with the plane on which the light sources O, X, Y are disposed. Via the aforesaid arrangement of the light sources O, X, Y, Z, under a condition that a field of view of image capturing contains all of the light sources O, X, Y, Z (regardless of whether the light sources are partly masked), when image capturing is performed at arbitrary positions with arbitrary attitudes, images thus obtained are different as long as either positions or attitudes during capturing in the free space are different, so as to have uniqueness. The attitude during capturing may be represented using an attitude angle that is described hereinafter.

The object 9, for example, may be a handheld remote controller for controlling a computer or a television to execute a game or a variety of functions, and performs interaction with a user via a display device 4. In this embodiment, the light source module 1 is suspended on the display device 4, but is not limited thereto, and may be installed in other manners or may be embedded into the display device 4. The light source O is disposed at an upper left corner of the display device 4, and the light sources X and Y are respectively disposed at an upper right corner and a lower left corner of the display device 4, but the present invention should not be limited in this respect. The light source O may be disposed at any one of the corners of the display device 4, or any other position adjacent to the display device 4. In this embodiment, the light sources O, X, Y and Z are, but not limited to, LED lamps that emit lights with different colors, such as red, blue, green and yellow, and are only required to emit lights whose wavelengths are distinct from each other.

The storage unit 32 stores a plurality of light source orientation data, a plurality of pre-stored attitude angles respectively corresponding to the light source orientation data, and a plurality of sets of pre-stored coordinates respectively corresponding to the light source orientation data, which are described hereinafter. The computing module 3 is configured to process information from the image capturing module 2 and to control the aforesaid computer or television.

The method includes the following steps:

Step S1: The image capturing module 2 captures an image of the light source module 1 to generate a to-be-judged image, and transmits the to-be-judged image to the processing unit 31 of the computing module 3.

The image capturing module 2 may be, for example, a color camera that includes a lens and a CMOS (complementary metal-oxide-semiconductor) photosensor, and is capable of obtaining images of the light sources O, X, Y, Z that emit lights with different colors.

Ideally, the light sources O, X, Y and Z emit lights in all directions, so as to facilitate image capturing by the image capturing module 2 at different positions. However, due to technical limits of the light emitting diodes (LED), if each of the light sources only uses one LED, light emitted thereby is primarily toward a front direction, but not limited thereto. This invention may use more than one LED, a wide-angle LED or other types of light sources to emit light in all directions.

Step S2: The processing unit 31 uses color differences to analyze positions of the light sources O, X, Y, Z in the to-be-judged image, so as to obtain coordinates of the light sources O, X, Y and Z in the to-be-judged image to serve as to-be-judged information. As an example, coordinates of a pixel disposed at an upper left corner of the to-be-judged image is defined to be (0, 0), and if the light source O has coordinates (100, 200), this represents that a central pixel of the light source O calculated by the processing unit 31 is reached through moving right by 100 pixels and moving down by 200 pixels from the pixel disposed at the upper left corner of the to-be-judged image. It should be noted that, since the light sources O, X, Y and Z emit lights whose wavelengths are distinct from each other, the light sources O, X, Y and Z have pixel values that are distinct from each other in the to-be-judged image, and the processing unit 31 identifies the light sources O, X, Y and Z in the to-be-judged image according to the pixel values thereof.

Step S3: The processing unit 31 compares the coordinates of the light sources O, X, Y, Z in the to-be-judged image with each of the light source orientation data to obtain at least one candidate light source orientation data similar to the to-be-judged information.

The pre-stored attitude angles, the pre-stored coordinates and the light source orientation data are described hereinbelow.

The pre-stored attitude angles are used to represent attitudes of the object 9 in the free space. For example, Tait-Bryan angles, which include components of a yaw angle, a pitch angle and a roll angle, are used in this embodiment.

The pre-stored coordinates are used to represent a position of the object 9 in the free space. For example, in this embodiment, the light source O serves as an origin to form a coordinate system having x, y and z axes that respectively extend from the light source O toward the light sources X, Y and Z, and coordinates (0, 0, 100) represent a position at the front side of the light source O by 100 centimeters.

Assuming that the attitude angle and the coordinates of the object 9 have been obtained, as long as the object 9 is not deformable, all states of the object 9 in the free space are confirmed. For example, a position at which a geometric center of the object 9 is located is represented using the obtained coordinates, axial directions in which the object 9 extends are represented using the obtained yaw angle and pitch angle, and a state in which the object 9 axially rotates is represented using the obtained roll angle.

Each light source orientation data is associated with a location of each of the light sources in a reference image. The reference image refers to an image of the light source module 1 that is pre-captured by the image capturing module 2 when the object 9 is located at a set of the pre-stored coordinates with orientation corresponding to one of the pre-stored attitude angles, and is used for establishing the light source orientation data. The light source orientation data may be obtained through analysis of the reference images.

In this embodiment, each light source orientation data includes relationships among the light sources in the corresponding reference image. In detail, an imaginary line segment connecting the light sources O, X is defined as a first line segment $L_1$, an imaginary line segment connecting the light sources O, Y is defined as a second line segment $L_2$, and an imaginary line segment connecting the first and fourth light sources O, Z is defined as a third line segment $L_3$. Each light source orientation data includes a length $L_1^P$ (the superscript P refers to the pre-captured reference image)

of the first line segment in the respective one of the reference images, a length $L_2^P$ of the second line segment in the respective one of the reference images, a length $L_3^P$ of the third line segment in the respective one of the reference images, an angle $\theta_1^P$ between the first and second line segments in the respective one of the reference images, an angle $\theta_2^P$ between the second and third line segments in the respective one of the reference images, an angle $\theta_3^P$ between the first and third line segments in the respective one of the reference images, coordinates $O^P$ ($O_1^P$, $O_2^P$) of the light source O in the respective one of the reference images, and a reference rotation angle $R^P$ of the first line segment.

Figure 3:
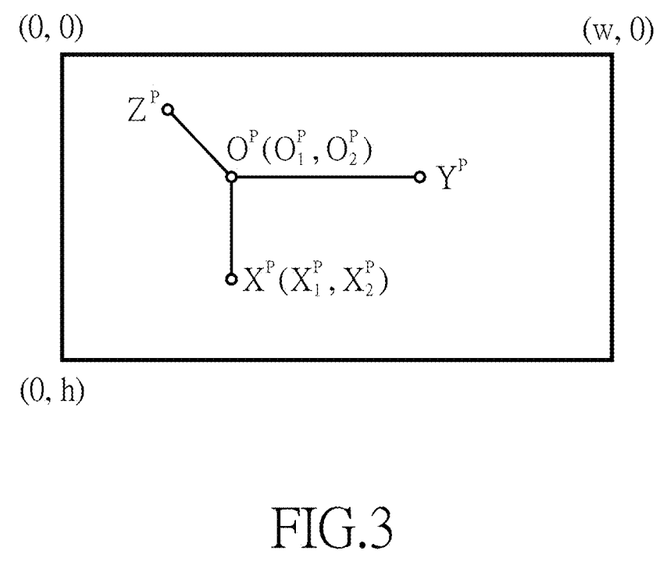
FIG. 3 is a schematic diagram illustrating coordinates of multiple light sources and a rotation angle for image analysis.

Referring to FIG. 3, in this embodiment, the reference rotation angle of the first line segment refers to an angle by which an imaginary reference line (not shown) rotates clockwise around the light source O from a six o'clock position to a position overlapping the first line segment in the respective one of the reference images. In this definition, the reference rotation angle of the first line segment in the reference image is zero when $O_1^P=X_1^P$, and $O_2^P>X_2^P$. With counterclockwise rotation of the object 9, a responsive angle by which the first line segment rotates clockwise is the reference rotation angle. In FIG. 3, the light source O has coordinates $O^P$ ($O_1^P$, $O_2^P$), the light source X has coordinates $X^P$ ($X_1^P$, $X_2^P$), coordinates of the upper left corner of the reference image are (0, 0), coordinates of the upper right corner of the reference image are (w, 0), and coordinates of the lower left corner of the reference image are (0, h).

Lengths of the line segments may be calculated using the Pythagorean theorem. For example, assuming $O^P$ ($O_1^P$, $O_2^P$)=(3, 6) and $X^P$ ($X_1^P$, $X_2^P$)=(5, 9), $L_1^P=\sqrt{(3-5)^2+(6-9)^2}=\sqrt{13}$, and $L_1^P$ is stored to be $\sqrt{13}$ in the storage unit 32. An included angle between two line segments may be calculated, for example, using the law of cosines. The law of cosines refers to that, assuming lengths of three sides of a triangle being respectively a, b and c, $a^2+b^2-2ab\cdot\cos\theta=c^2$, where $\theta$ is the included angle between the two sides with the lengths a and b. Assuming the length of the first line segment $L_2^P=a$, the length of the second line segment $L_2^P=b$, and calculating a distance c between $X^P$ and $X^P$, the included angle $\theta_1^P$ of the first and second line segments may be calculated using the law of cosines.

Figure 4:
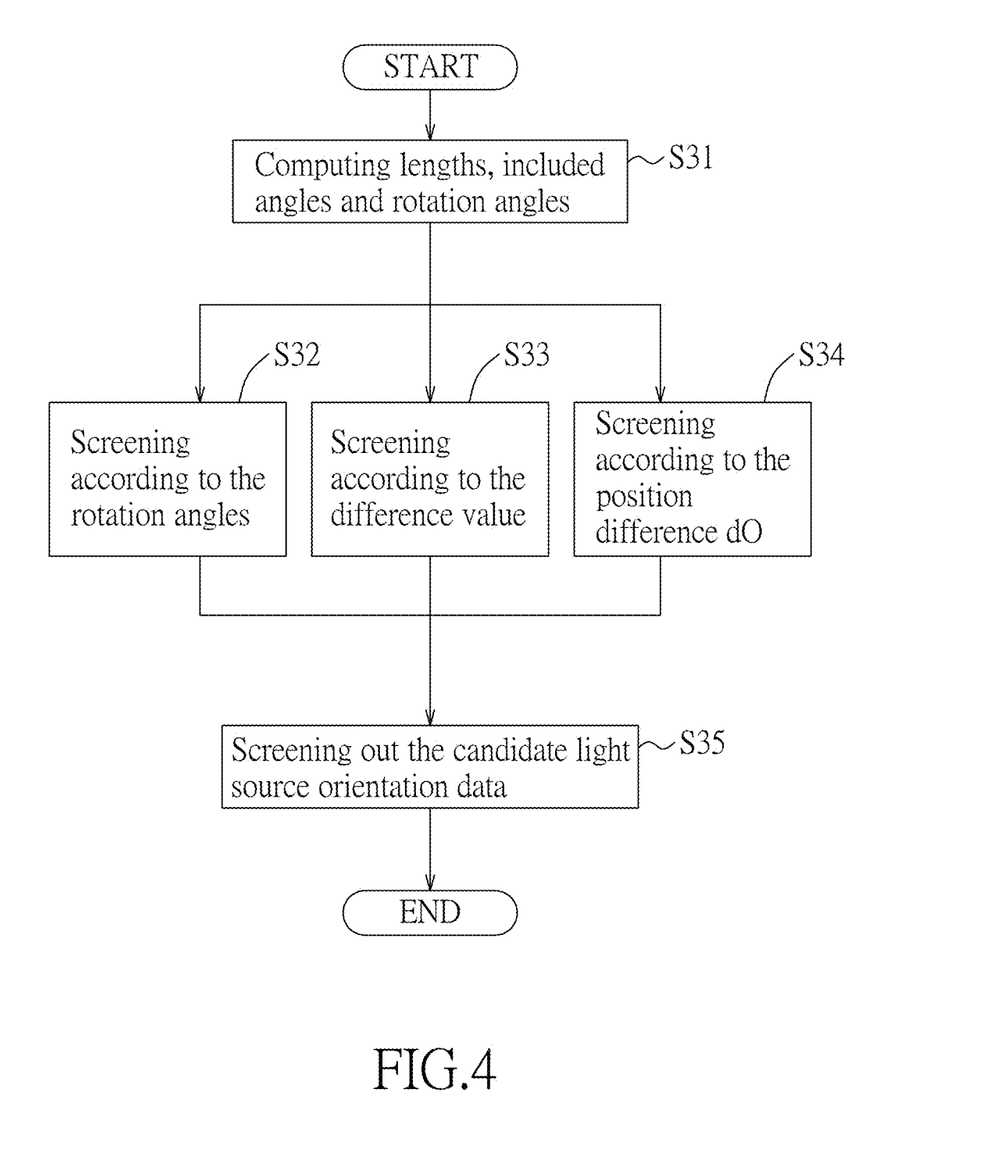
FIG. 4 is a flowchart illustrating step S3 of the embodiment of the free space positioning method.

Referring to FIG. 4, step S3 includes the following steps S31 to S35 that are performed by the processing unit 31:

Step S31: The processing unit 31 computes the to-be-judged information associated with the coordinates of the first, second, third and fourth light sources in the to-be-judged image. The to-be-judged information includes a length $L_1^Q$ (the superscript Q refers to the to-be-judged image) of the first line segment in the to-be-judged image, a length $L_2^Q$ of the second line segment in the to-be-judged image, a length $L_3^Q$ of the third line segment in the to-be-judged image, an angle $\theta_1^Q$ between the first and second line segments in the to-be-judged image, an angle $\theta_2^Q$ between the second and third line segments in the to-be-judged image, an angle $\theta_3^Q$ between the first and third line segments in the to-be-judged image, and a to-be-judged rotation angle $R^Q$ of the first line segment in the to-be-judged image. The to-be-judged rotation angle $R^Q$ has a definition similar to that of the reference rotation angle in the description for the reference image. Then, the flow goes to steps S32 to S34. It should be noted that sequences among steps S32 to S34 are not limited to the particular sequence of the following descriptions.

Step S32: This step may be a step of computing an absolute difference value $dR=|R^Q-R^P|$ according to the reference rotation angle $R^P$ in each of the light source orientation data, and each of the light source orientation data screened out in this step has a corresponding dR smaller than a predetermined threshold value for the rotation angle. In another embodiment, the light source orientation data may be classified into, for example, eight rotation angle groups according to the reference rotation angles $R^P$ thereof, i.e., groups of 0°, 45°, 90°, 135°, 180°, 225°, 270° and 315°, where each of the groups may cover a range of 45 degrees, and this step may be a step of determining one of the rotation angle groups to which the to-be-judged rotation angle $R^Q$ belongs. Each of the light source orientation data screened out in this step has the reference rotation angle $R^P$ belonging to the same one of the rotation angle groups to which the to-be-judged rotation angle $R^Q$ belongs.

Step S33: The processing unit 31 compares the to-be-judged information with each of the light source orientation data, calculates a difference value f, where $$f = \sqrt{\begin{array}{l}(L_1^Q - L_1^P)^2 + (L_2^Q - L_2^P)^2 + (L_3^Q - L_3^P)^2 + \\ (\theta_1^Q - \theta_1^P)^2 + (\theta_2^Q - \theta_2^P)^2 + (\theta_3^Q - \theta_3^P)^2\end{array}},$$

and screens out the light source orientation data having a corresponding difference value f that is smaller than or equal to a predetermined threshold value for the difference value f. An object of this step is to find out the light source orientation data that have the lengths of the line segments and the included angles close to the state of the to-be-judged image as a whole.

Step S34: The processing unit 31 computes a distance $dO=\sqrt{(O_1^Q-O_1^P)^2+(O_2^Q-O_2^P)^2}$, where dO represents a position difference between a position of the light source O in the to-be-judged image and a position of the light source O in the respective one of the reference images. Then, the processing unit 31 screens out the light source orientation data having a corresponding position difference dO smaller than or equal to a predetermined threshold distance value.

Step S35: The processing unit 31 screens out candidate light source orientation data that are screened out in all of the steps S32 to S34 as a final screening result. It should be noted that, in order to reduce computation loads, steps S32 to S34 may be performed sequentially, and the later performed steps are only required to perform computation and screening on the light source orientation data that have been screened out in the previously performed steps. In such a case, step S35 may be omitted.

Significance of the steps S32 to S34 with regard to identifying the attitude angle and the coordinates of the object 9 in the free space are described hereinafter.

Step S32 is to compare the angle that the image rotates to identify the roll angle of the object 9. By use of a location in the image as a basis to calculate an angle that the image rotates, the roll angle may be obtained.

Step S33 is to identify variations in lengths and angles in the three-dimensional space, and to screen out some light source orientation data similar to the to-be-judged information. Finding out the most similar light source orientation data means to find the one with the smallest difference in length and the smallest difference in angle, so that the comparison should be performed in combination.

Step 34 is to use positions of the light source O in the images to determine the yaw angle and the pitch angle of the object 9. With the same position and the same roll angle, the position of the origin may change with variations of the yaw angle and the pitch angle, so that the corresponding angles may thus be found.

It should be noted that the screening method is not limited to use of the threshold values as mentioned above. For example, the light source orientation data may be ranked according to the absolute difference value of the reference rotation angles, the difference value f and the distance dO to screen out the top three to serve as the screening result. There are a variety of conventional methods suitable for ranking, such as using a weighted sum to calculate a weighted score, and details thereof are omitted herein for the sake of brevity.

Step S4: The processing unit 31 estimates an attitude angle of the object 9 according to the pre-stored attitude angle and the pre-stored coordinates corresponding to each of the candidate light source orientation data. As to the attitude angle, the estimated attitude angle $$A^E = \left( \frac{A_1^1 + A_1^2 + \ldots + A_1^k + \ldots + A_1^N}{N}, \frac{A_2^1 + A_2^2 + \ldots + A_2^k + \ldots + A_2^N}{N}, \frac{A_3^1 + A_3^2 + \ldots + A_3^k + \ldots + A_3^N}{N} \right)$$

(the superscript E refers to estimation), where N represents a number of the candidate light source orientation data, and the pre-stored attitude angle corresponding to the $k^{th}$ candidate light source orientation data is represented as $(A_1^k, A_2^k, A_3^k)$. As to the coordinates, the estimated coordinates $$C^E = \left( \frac{C_1^1 + C_1^2 + \ldots + C_1^k + \ldots + C_1^N}{N}, \frac{C_2^1 + C_2^2 + \ldots + C_2^k + \ldots + C_2^N}{N}, \frac{C_3^1 + C_3^2 + \ldots + C_3^k + \ldots + C_3^N}{N} \right)$$

where N represents a number of the candidate light source orientation data, and the pre-stored coordinates corresponding to a $k^{th}$ candidate light source orientation data are represented as $(C_1^k, C_2^k, C_3^k)$.

The second embodiment of the free space positioning method according to the present invention is similar to the first embodiment, and differs in that, in step S3, screening is not performed using lengths, included angles and rotation angles, and is directly performed using the coordinates of the light sources O, X, Y and Z. That is, the to-be-judged information does not include information of lengths, included angles and rotation angles, but includes information of the coordinates of the light sources O, X, Y and Z in the to-be-judged image. Therefore, the light source orientation data do not include information of lengths, included angles and rotation angles either, but include information of coordinates of the light sources O, X, Y and Z in the reference images that are pre-captured when the object 9 is located at the pre-stored coordinates with the pre-stored attitude angles.

In detail, each of the light source orientation data includes coordinates $O^P(O_1^P, O_2^P)$ of the light source O in the respective one of the reference images, coordinates $X^P(X_1^P, X_2^P)$ of the light source X in the respective one of the reference images, coordinates $Y^P(Y_1^P, Y_2^P)$ of the light source Y in the respective one of the reference images, and coordinates $Z^P(Z_1^P, Z_2^P)$ of the light source Z in the respective one of the reference images. The to-be-judged information obtained from analysis in step S2 includes coordinates $O^Q(O_1^Q, O_2^Q)$ of the light source O in the to-be-judged image, coordinates $X^Q(X_1^Q, X_2^Q)$ of the light source X in the to-be-judged image, coordinates $Y^Q(Y_1^Q, Y_2^Q)$ of the light source Y in the to-be-judged image, and coordinates $Z^Q(Z_1^Q, Z_2^Q)$ of the light source Z in the to-be-judged image. Step S3 of this embodiment performs comparison and screening by: computing a difference value $f = \sqrt{(dO)^2 + (dX)^2 + (dY)^2 + (dZ)^2}$, where $dO = \sqrt{(O_1^Q - O_1^P)^2 + (O_2^Q - O_2^P)^2}$, $dX = \sqrt{(X_1^Q - X_1^P)^2 + (X_2^Q - X_2^P)^2}$, $dY = \sqrt{(Y_1^Q - Y_1^P)^2 + (Y_2^Q - Y_2^P)^2}$, and $dZ = \sqrt{(Z_1^Q - Z_1^P)^2 + (Z_2^Q - Z_2^P)^2}$. In other words, a position difference of each of the light sources O, X, Y, Z between the reference image and the to-be-judged image is calculated first, and then the overall difference is calculated.

As a result, the coordinates of the light sources O, X, Y, Z of the candidate light source orientation data would be close to the coordinates of the light sources O, X, Y, Z of the to-be-judged image, and the attitude angle and coordinates thus estimated would be close to a real state of the object 9.

To sum up, by using the image capturing module 2 to capture an image of the light source module 1 for analyzing and obtaining the to-be-judged information associated with the coordinates of the light sources O, X, Y, Z, to screen out one or more candidate light source orientation data similar to the to-be-judged information, the attitude angle and the coordinates of the object 9 may be estimated.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A free space positioning method for estimating an attitude angle of an object in a free space, said free space positioning method comprising the steps of:
   (A) providing a free space positioning system that includes a light source module, an image capturing module disposed at the object, and a computing module communicatively coupled with the image capturing module, the computing module including a processing unit and a storage unit, the light source module including a first light source, a second light source and a third light source that are non-collinear to define a plane, and a fourth light source that is non-coplanar with the plane, the storage unit storing a plurality of light source orientation data and a plurality of pre-stored attitude angles respectively corresponding to the light source orientation data; and capturing, by the image capturing module, an image of the light source module to generate a to-be-judged image, and transmitting the to-be-judged image to the processing unit of the computing module;
   (B) analyzing, by the processing unit, coordinates of the first, second, third and fourth light sources in the to-be-judged image to obtain to-be-judged information associated with the coordinates of the first, second, third and fourth light sources in the to-be-judged image;

(C) comparing, by the processing unit, the to-be-judged information with the light source orientation data stored in the storage unit to obtain at least one candidate light source orientation data similar to the to-be-judged information; and (D) estimating, by the processing unit, an attitude angle of the object according to the pre-stored attitude angle corresponding to each of the candidate light source orientation data obtained in step (C).

2. The free space positioning method as claimed in claim 1, wherein step (C) includes: computing, by the processing unit, a first value associated with a difference between the to-be-judged information and one of the light source orientation data, the candidate light source orientation data obtained in step (C) having a corresponding first value that is smaller than or equal to a first predetermined threshold value.

3. The free space positioning method as claimed in claim 2, further comprising, prior to step (A), the steps of:

capturing, by the image capturing module, a plurality of reference images of the light source module, each of the reference images being captured when orientation of the object has a respective one of the pre-stored attitude angles; and analyzing the reference images to obtain the light source orientation data, wherein each of the light source orientation data is associated with a position of each of the first, second, third and fourth light sources in a respective one of the reference images.

4. The free space positioning method as claimed in claim 3, wherein, in the step of capturing the reference images, each of the reference images is captured when the object is located at a corresponding set of coordinates and orientation of the object has the respective one of the pre-stored attitude angles.

5. The free space positioning method as claimed in claim 3, wherein:

an imaginary line segment connecting the first and second light sources is defined as a first line segment, an imaginary line segment connecting the first and third light sources is defined as a second line segment, and an imaginary line segment connecting the first and fourth light sources is defined as a third line segment;

the to-be-judged information obtained in step (B) includes:
a length $L_1^Q$ of the first line segment in the to-be-judged image, a length $L_2^Q$ of the second line segment in the to-be-judged image, a length $L_3^Q$ the third line segment in the to-be-judged image, an angle $\theta_1^Q$ between the first and second line segments in the to-be-judged image, an angle $\theta_2^Q$ between the second and third line segments in the to-be-judged image, and an angle $\theta_3^Q$ between the first and third line segments in the to-be-judged image;

each of the light source orientation data includes:
a length $L_1^P$ of the first line segment in the respective one of the reference images, a length $L_2^P$ of the second line segment in the respective one of the reference images, a length $L_3^P$ of the third line segment in the respective one of the reference images, an angle $\theta_1^P$ between the first and second line segments in the respective one of the reference images, an angle $\theta_1^P$ between the second and third line segments in the respective one of the reference images, and an angle $\theta_3^P$ between the first and third line segments in the respective one of the reference images; and in step (C), the first value is computed according to:

$$f = \sqrt{\begin{array}{l}(L_1^Q - L_1^P)^2 + (L_2^Q - L_2^P)^2 + (L_3^Q - L_3^P)^2 + \\ (\theta_1^Q - \theta_1^P)^2 + (\theta_2^Q - \theta_2^P)^2 + (\theta_3^Q - \theta_3^P)^2\end{array}}$$

where f represents the first value.

6. The free space positioning method as claimed in claim 3, wherein:

each of the light source orientation data includes coordinates $(O_1^P, O_2^P)$ of the first light source in the respective one of the reference images, and the to-be-judged information includes coordinates $(O_1^Q, O_2^Q)$ of the first light source in the to-be-judged image; and step (C) further includes: computing, by the processing unit, a second value according to:

$$dO = \sqrt{(O_1^Q - O_1^P)^2 + (O_2^Q - O_2^P)^2}$$

where dO represents the second value, the candidate light source orientation data obtained in step (C) having a corresponding second value smaller than or equal to a second predetermined threshold value.

7. The free space positioning method as claimed in claim 3, wherein:

an imaginary line segment connecting the first and second light sources is defined as a first line segment, an imaginary line segment connecting the first and third light sources is defined as a second line segment, and an imaginary line segment connecting the first and fourth light sources is defined as a third line segment;

each of the light source orientation data includes a rotation angle $R^P$ between an imaginary reference line and one of the first, second and third line segments toward a predetermined angular direction in the respective one of the reference images;

the to-be-judged information includes a rotation angle $R^Q$ between the imaginary reference line and said one of the first, second and third line segments toward the predetermined angular direction in the to-be-judged image; and step (C) further includes: computing, by the processing unit, a second value according to:

$$dR = |R^Q - R^P|$$

where dR represents the second value, the candidate light source orientation data obtained in step (C) having a corresponding second value smaller than a second predetermined threshold value.

8. The free space positioning method as claimed in claim 3, wherein:

an imaginary line segment connecting the first and second light sources is defined as a first line segment, an imaginary line segment connecting the first and third light sources is defined as a second line segment, and an imaginary line segment connecting the first and fourth light sources is defined as a third line segment;

each of the light source orientation data includes a reference rotation angle between an imaginary reference line and one of the first, second and third line segments toward a predetermined angular direction in the respective one of the reference images, and the light source orientation data are classified into a plurality of rotation angle groups according to the reference rotation angles thereof;

the to-be-judged information includes a to-be-judged rotation angle between the imaginary reference line and said one of the first, second and third line segments toward the predetermined angular direction in the to-be-judged image; and step (C) further includes: determining, by the processing unit, one of the rotation angle groups to which the to-be-judged rotation angle belongs, the candidate light source orientation data obtained in step (C) having the reference rotation angle belonging to the same one of the rotation angle groups to which the to-be-judged rotation angle belongs.

9. The free space positioning method as claimed in claim 3, wherein:

each of the light source orientation data includes coordinates $(O_1^P, O_2^P)$ of the first light source in the respective one of the reference images, coordinates $(X_1^P, X_2^P)$ of the second light source in the respective one of the reference images, coordinates $(Y_1^P, Y_2^P)$ of the third light source in the respective one of the reference images, and coordinates $(Z_1^P, Z_2^P)$ of the fourth light source in the respective one of the reference images; and the to-be-judged information includes coordinates $(O_1^Q, O_2^Q)$ of the first light source in the to-be-judged image, coordinates $(X_1^Q, X_2^Q)$ of the second light source in the to-be-judged image, coordinates $(Y_1^Q, Y_2^Q)$ of the third light source in the to-be-judged image, and coordinates $(Z_1^Q, Z_2^Q)$ of the fourth light source in the to-be-judged image; and in step (C), the first value is computed according to:

$$f = \sqrt{(dO)^2 + (dX)^2 + (dY)^2 + (dZ)^2}$$

where:
f represents the first value, $$dO = \sqrt{(O_1^Q - O_1^P)^2 + (O_2^Q - O_2^P)^2}, \quad dX = \sqrt{(X_1^Q - X_1^P)^2 + (X_2^Q - X_2^P)^2},$$

$$dY = \sqrt{(Y_1^Q - Y_1^P)^2 + (Y_2^Q - Y_2^P)^2}, \text{ and } dZ = \sqrt{(Z_1^Q - Z_1^P)^2 + (Z_2^Q - Z_2^P)^2}.$$

10. The free space positioning method as claimed in claim 1, wherein step (D) includes the step of averaging, by the processing unit, the pre-stored attitude angle corresponding to the at least one candidate light source orientation data, so as to estimate the attitude angle of the object.

11. The free space positioning method as claimed in claim 10, wherein the pre-stored attitude angle corresponding to a $k^{th}$ candidate light source orientation data is $(A_1^k, A_2^k, A_3^k)$, and the processing unit estimates the attitude angle of the object according to:

$$A^E = \left( \frac{A_1^1 + A_1^2 + \ldots + A_1^k + \ldots + A_1^N}{N}, \frac{A_2^1 + A_2^2 + \ldots + A_2^k + \ldots + A_2^N}{N}, \frac{A_3^1 + A_3^2 + \ldots + A_3^k + \ldots + A_3^N}{N} \right)$$

where $A^E$ represents the attitude angle of the object estimated by the processing unit, and N represents a number of the candidate light source orientation data.

12. The free space positioning method as claimed in claim 1, wherein the first, second, third and fourth light sources of the light source module are configured to emit lights whose wavelengths are distinct from each other, such that the first, second, third and fourth light sources have pixel values that are distinct from each other in the to-be-judged image, and the processing unit identifies the first, second, third and fourth light sources in the to-be-judged image according to the pixel values thereof in step (B).

13. The free space positioning method as claimed in claim 1, the storage unit further storing a plurality of sets of pre-stored coordinates respectively corresponding to the light source orientation data, wherein step (D) further includes the step of averaging, by the processing unit, the pre-stored coordinates corresponding to the at least one candidate light source orientation data, so as to estimate coordinates of the object.

14. The free space positioning method as claimed in claim 13, wherein the pre-stored coordinates corresponding to a $k^{th}$ candidate light source orientation data are $(C_1^k, C_2^k, C_3^k)$, and the processing unit estimates the coordinates of the object according to:

$$C^E = \left( \frac{C_1^1 + C_1^2 + \ldots + C_1^k + \ldots + C_1^N}{N}, \frac{C_2^1 + C_2^2 + \ldots + C_2^k + \ldots + C_2^N}{N}, \frac{C_3^1 + C_3^2 + \ldots + C_3^k + \ldots + C_3^N}{N} \right)$$

where $C^E$ represents the coordinates of the object estimated by the processing unit, and N represents a number of the candidate light source orientation data.

15. A free space positioning system for estimating an attitude angle of an object in a free space, comprising:

a light source module including a first light source, a second light source and a third light source that are non-collinear to define a plane, and a fourth light source that is non-coplanar with the plane;

an image capturing module to be disposed at the object, and configured to capture an image of said light source module to generate a to-be-judged image; and a computing module configured to communicatively couple with said image capturing module, and including:

a storage unit storing a plurality of light source orientation data and a plurality of pre-stored attitude angles respectively corresponding to the light source orientation data; and a processing unit coupled to said storage unit, and configured to analyze coordinates of said first, second, third and fourth light sources in the to-be-judged image to obtain to-be-judged information associated with the coordinates of said first, second, third and fourth light sources in the to-be-judged image, compare the to-be-judged information with the light source orientation data stored in said storage unit to obtain at least one candidate light source orientation data similar to the to-be-judged information, and estimate an attitude angle of the object according to the pre-stored attitude angle corresponding to each of the candidate light source orientation data.

16. The free space positioning system as claimed in claim 15, wherein said processing unit is configured to compare the to-be-judged information with the light source orientation data by computing a first value associated with a difference between the to-be-judged information and one of the light source orientation data, the candidate light source orientation data having a corresponding first value that is smaller than or equal to a first predetermined threshold value.

17. The free space positioning system as claimed in claim 15, wherein said processing unit is configured to estimate the attitude angle of the object by averaging the pre-stored attitude angle corresponding to the at least one candidate light source orientation data.

18. The free space positioning system as claimed in claim 15, wherein said first, second, third and fourth light sources of said light source module are configured to emit lights whose wavelengths are distinct from each other, such that said first, second, third and fourth light sources have pixel values that are distinct from each other in the to-be-judged image, and said processing unit identifies said first, second, third and fourth light sources in the to-be-judged image according to the pixel values thereof.

19. The free space positioning system as claimed in claim 15, wherein said storage unit further stores a plurality of sets of pre-stored coordinates respectively corresponding to the light source orientation data, and said processing unit is further configured to estimate coordinates of the object by averaging the pre-stored coordinates corresponding to the at least one candidate light source orientation data.

* * * * *